United States Patent [19]

Randall et al.

[11] 3,728,381
[45] Apr. 17, 1973

[54] PRODUCTION OF 2-HALOETHYLPHOSPHONIC ACID

[75] Inventors: David L. Randall; Calvin Vogel, both of Easton, Pa.

[73] Assignee: GAF Corporation, New York, N.Y.

[22] Filed: Nov. 10, 1969

[21] Appl. No.: 875,481

[52] U.S. Cl..................260/502.4 R, 71/86, 260/936, 260/937, 260/952
[51] Int. Cl. ..........................C07d 9/38, A01n 5/00
[58] Field of Search ....................260/502.4 R, 652 R

[56] References Cited

UNITED STATES PATENTS

| | | | |
|---|---|---|---|
| 2,724,718 | 11/1955 | Stiles et al. | 260/502.4 R |
| 3,341,579 | 9/1967 | Kunstle et al. | 260/652 R |
| 2,454,645 | 11/1948 | Galitzenstein et al. | 260/652 R |
| 2,660,602 | 11/1953 | Wiese | 260/652 R |
| 3,184,496 | 5/1965 | Baranasckas et al. | 260/502.4 R |

OTHER PUBLICATIONS

Degering et al., "An Outline of Organic Chemistry," 1939, 3rd ed., page 89.

Primary Examiner—Leon Zitver
Assistant Examiner—Joseph E. Evans
Attorney—S. B. Leavitt and Walter C. Kehm

[57] ABSTRACT

2-Haloethylphosphonic acids are prepared from 2-acyloxyethylphosphonic acids or esters of the formula:

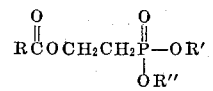

wherein R is alkyl, cycloalkyl, haloalkyl or aryl and R' is hydrogen, alkyl, haloalkyl, cycloalkyl and R" is the same or different as R', or R' and R" are joined by methylene groups to form a heterocyclic ring, by anhydrous hydrogen halide cleavage at a temperature of about 30°–200°C. The products are useful as plant growth regulators.

9 Claims, No Drawings

PRODUCTION OF 2-HALOETHYLPHOSPHONIC ACID

BACKGROUND OF THE INVENTION

1. Field of the Invention

This invention relates to an improved process for the preparation of 2-haloethylphosphonic acids by anhydrous hydrogen halide cleavage of the corresponding 2-acyloxyethylphosphonic acids and/or esters.

2. Description of the Prior Art

2-Haloethylphosphonic acids are known in the art as valuable plant growth stimulants or regulators in the agricultural field. Thus, these compounds, particularly the 2-chloroethyl compounds, have been used extensively as plant growth hormones for increasing crop yields of plants such as soybeans, pineapples, tomatoes and the like. The usefulness of these compounds is illustrated for example in the publication *Nature*, Vol. 218, page 974, (1968), by Cook and Randall.

The 2-haloethylphosphonic acid compounds produced by the process of this invention are soluble in varying degrees in water and thus they can be applied to plants in aqueous solutions composed wholly or partially of water; partial solutions include those formed of water and say acetone or methyl ethyl ketone. Any aqueous medium may be used provided that it is not toxic to the plant. Also, the compounds may be adsorbed on solid carriers such as vermiculite, attaclay, talc and the like for application in granular form. Dusts may also be used in which case the derivative(s) will be diluted with clays or other powders, for example pyrophyllite, diatomaceous earth and attapulgite.

The compounds can be applied to the plants at a concentration of from ½ to 10 lbs./Acre or higher. A preferred rate of application ranges from 2-5 lbs/Acre. The compounds need only be applied to the plant in low volumes of water to achieve satisfactory flower initiation, and this is an important advantage of the compounds. Whereas it is necessary to apply known agents in larger volumes of water, of the order of 200–400 gallons/acre, even up to 1,000 gallons/acre in the case of ethylene to achieve flower initiation, it is possible to apply a compound produced by the process of this invention in far lower volumes of water to achieve satisfactory flower initiation. For example, 2-chloroethylphosphonic acid can be applied in 50 gallons of water at the rate of 1 lb./acre to achieve 100 percent flower induction on pineapples of the Smooth Cayenne variety. The ability to apply the agent in a reduced volume of water is a great agronomic advantage because a larger acreage of plantation can be treated before recourse to a water supply is necessary, smaller equipment can be used, and costs can be reduced generally.

In the preparation of these known products however, the processes used heretofore have not been satisfactory as they have not been able to provide products of sufficient purity as to obviate all toxicity effects of the impurities normally found therein. Primarily, the procedures for the preparation of these compounds have been by hydrolysis or cleavage of the corresponding 2-chloroethylphosphonate diester with either aqueous hydrochloric acid or anhydrous hydrogen chloride. While both the aqueous hydrochloric acid hydrolysis or anhydrous hydrogen chloride cleavage have proceeded satisfactorily from a chemical standpoint, the resulting products have been found to contain such sufficient amounts of by-products that the processes have not been entirely satisfactory for use on a commercial basis. Thus the anhydrous hydrogen chloride cleavage of 2-chloroethylphosphorus esters to 2-chloroethylphosphonic acid has the disadvantage of providing a considerable amount of the mono ester derivative. Hence, since 2-chloroethylphosphonic acid has application as a plant growth regulator for many crops, for example, pineapples, toxicants or potential sources of toxicants must be avoided. The monester is of course a potential source of the toxicant 2-chloroethanol.

In the hydrolysis reaction with concentrated hydrochloric acid of esters of 2-chloroethylphosphonic acid, the reaction generally must be carried out under pressure. Therefore expensive corrosion resistant equipment must be used and there is an inherent danger in this procedure that equipment failure would lead to the release of copious quantities of hydrogen chloride. In addition the aqueous hydrolysis procedure has the disadvantage that by the time the ester groups have been hydrolyzed off, some of the halogen in the ethane group had been hydrolyzed to hydroxyl so that a substantial amount of 2-hydroxyethanephosphonic acid is present in the product and therefore this compound represents a substantial impurity in the final desired products by this method.

It is therefore apparent that it is important to provide a procedure by which the formation of all impurities of this type can be obviated. The process of the present invention provides such a process wherein all the potential by-products which may be toxic to the plants to which the product is administered are obviated.

SUMMARY OF THE INVENTION

It is accordingly one object of this invention to provide a process by which 2-acyloxyethylphosphonic acids and ester derivatives may be cleaved to provide the desired 2-haloethylphosphonic acids.

A further object of the invention is to provide a procedure wherein the reaction is conducted with anhydrous hydrogen chloride at an elevated temperature which minimizes the formation of undesirable impurities while providing the desired products in excellent yields.

A still further object of the invention is to provide a process wherein 2-acyloxyethylphosphonic acids and their ester derivatives may be cleaved by anhydrous hydrogen chloride at elevated temperatures to provide the desired 2-haloethylphosphonic acids in high yields and maximum purity.

Further objects and advantages of the present invention will become apparent as the description thereof proceeds.

In satisfaction of the foregoing objects and advantages there is provided by this invention a process for the preparation of 2-haloethylphosphonic acids of the formula:

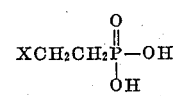

wherein X is chlorine or bromine, which comprises treating a 2-acyloxyethylphosphonic acid or ester of the formula:

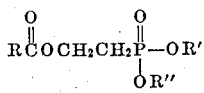

wherein R is alkyl of about one to seven carbon atoms, cycloalkyl of three to about eight carbon atoms, haloalkyl of about four to seven carbon atoms or aryl of about six to 12 carbon atoms, R' is hydrogen, alkyl of about one to seven carbon atoms, haloalkyl of about two to seven carbons or cycloalkyl of three to about eight carbon atoms and R'' is the same or different as R', or R' and R'' are joined by methylene groups to form a heterocyclic ring, with anhydrous hydrogen halide at a temperature ranging from about 30°–200°C. and recovering the products produced free from impurities.

DESCRIPTION OF PREFERRED EMBODIMENTS

As indicated above this invention is concerned with a procedure for the anhydrous hydrogen chloride cleavage of certain 2-acyloxyethylphosphonic acids and ester derivatives. These starting materials have the following formula:

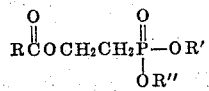

wherein in this formula, R may be an alkyl group of one to seven carbon atoms for example methyl, ethyl, n-propyl, n-butyl, isopropyl, n-pentyl, and the like; cycloalkyl of three to eight carbon atoms, for example cyclopropyl, cyclobutyl, cyclopentyl, cyclohexyl, cycloheptyl and cyclooctyl; haloalkyl of one to seven carbon atoms wherein the halogen is chlorine or bromine and covering such radicals as chloromethyl, 2-chloroethyl, 3-chloropropyl, 4-chlorobutyl, the corresponding bromo derivatives and the like; aryl of about six to 12 carbon atoms, e.g., phenyl and naphthyl as well as alkyl substituted aryl groups such as tolulyl, xylyl, and the like; R' is hydrogen; alkyl of one to seven carbon atoms, such as methyl, ethyl, n-propyl, isopropyl, n-butyl, etc.; haloalkyl of two to about seven carbon atoms, for example, 2-chloroethyl, 2-chloropropyl, 3-chloropropyl, 4-chlorobutyl etc., as well as the corresponding bromo, iodo and fluoro derivatives; cycloalkyl of three to about eight carbon atoms, e.g., cyclopropyl, cyclobutyl, cyclopentyl, cyclohexyl, etc. and R'' is the same as or different as one of the radicals of R', or R' and R'' can be joined by methy-lene groups to form a ring of two to about six carbon atoms. Thus the starting materials may comprise either the 2-acyloxyethylphosphonic acids, per se, their corresponding diesters or their cyclic esters. Compounds wherein R' and R'' represent hydrogen are particularly preferred.

These acyloxyethylphosphonic acids and derivatives may be prepared by treating a dialkyl hydrogen phosphite or alkylene hydrogen phosphite with a vinyl ester of a carboxylic acid in the presence of a free-radical generator such as tertiary butyl perbenzoate. This reaction for preparation of the starting materials proceeds as follows:

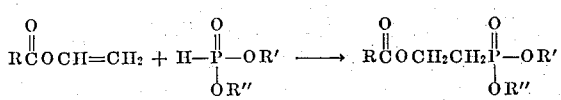

wherein, in this equation, R, R' and R'' are the same as described above. Hence either the acids (R' and R'' are hydrogen) or the ester derivatives may be prepared by this method. The preparation of these starting materials is known from the article by Sasin et al., *Jour. Am. Chem. Soc.*, Vol. 81, pages 6275 to 6277 (1959). In this publication the addition of dialkyl phosphonates to unsaturated compounds are described as being conducted in the presence of a chemical or physical free-radical initiator. These reactions were carried out generally at temperatures of about 100°–110°C. to provide good yields of the starting materials.

According to this invention it has been found that these acyloxyethylphosphonate acids and/or corresponding esters can be cleaved by hydrogen halide, preferably hydrogen chloride, to yield the desired 2-haloethylphosphonic acids in good yields and high purity. The reaction is preferably conducted at atmospheric pressure although elevated pressures of the hydrogen halide may be employed if desired.

The reaction is conducted over a temperature range of from about 30°–200°C. with temperatures of 100°–160°C. being preferred for best results and ease of reaction.

As will be noted from the equation, when the acid is used as the starting material (R' and R''=H), it is cleaved by the hydrogen halide only at the acyloxy radical to yield the 2-haloethylphosphonic acid. However, when R' and/or R'' are other than hydrogen, the ester starting materials will require cleavage in two or three positions and it is generally necessary to use higher temperatures in the reaction. Therefore it is to be understood that single or multiple cleavage is required in the reaction depending on the particular starting materials employed.

The reaction is generally conducted by charging the starting material to a reactor, raising to the desired temperatures and passing the required amount of ahydrous hydrogen halide (preferably hydrogen chloride), into the mixture which is being vigorously agitated. Generally about three moles of hydrogen halide are employed per mole of starting material. The reaction time will vary from about 5–25 hours depending on the amounts of the materials used. At the end of the reaction period the acid cleaved from the ester portion is removed to provide the final product. As the hydrogen halide employed is of the anhydrous form, care should be taken to maintain the reaction mixture essentially free from moisture.

As indicated, the process disclosed herein has the advantage over the prior processes discussed above in that the hydrogen halide necessary to be employed in the reaction is not sufficient to form impurities such as the 2-hydroxyethyl derivatives in that it is fully utilized to cleave the 2 acyloxyethyl group and thereby provide a final product in substantially pure form without the presence of the impurities noted hereinbefore. Accordingly, it represents a distinct advance in the art.

The following examples are presented to illustrate the process of the invention but are not to be considered as limited thereto.

EXAMPLE I

Preparation of 2 Acetoxyethylphosphonic Acid

A solution of 82 grams (1 mole) of phosphorus acid in 500 ml. 50 percent aqueous acetic acid was purged with nitrogen gas for 1 hour at 90°C. Five grams of tert-butyl perbenzoate was added. Vinyl acetate (86 grams, 1 mole) was then dropped in continuously with vigorous stirring over the course of 6 hours while the temperature was maintained at 90°C. An additional 5 grams of tert-butyl perbenzoate were added after 2 hours and again after 4 hours. At the end of this time the solvent was removed by flash distillation at reduced pressure. The residue, which was a pale yellow liquid, was extracted thoroughly with benzene. There was thus obtained 155 grams of a pale yellow liquid. The NMR spectrum of this liquid showed a pentet at 4.05–4.55 ppm. (actually two triplets partially superimposed) at 1.82–2.45 ppm. (singlet at 2.05 ppm) relative intensity 2.6 (due to $CH_2P$ and $CH_3C$), the OH line was at 6.54 ppm. All lines are relative to sodium 2,2-dimethyl-2-silapentane sulfonate. This material was used as the starting material for Example III below.

EXAMPLE II

Dry hydrogen chloride was passed into 39.2 grams (0.2 mole) of vigorously stirred 2-acetoxyethylphosphonic acid diethyl ester at a rate of 125 ml./minute and a temperature of 150°C. The total reaction time was 16 hours. At the end of this time the product was a thick pale yellow liquid. Acetic acid was removed at reduced pressure leaving 28.0 grams of a pale yellow liquid which solidified on standing. Titration of the product showed that it contained at least 75 percent 2-chloroethylphosphonic acid. The NMR spectrum had a singlet at 5.7 ppm., intensity 1, OH; multiplet at 3.5–4.0 ppm., intensity 1, $CH_2Cl$; two triplets at 2.0–2.0 ppm., intensity 1, $CH_2P$. There were no lines due to vinyl protons. All lines were relative to sodium 2,2-dimethyl-2-silacyclopentane sulfonate.

EXAMPLE III

Example II was repeated except that 33.6 grams (0.2 mole) of 2-acetoxyethylphosphonic acid from Example I were used. There was isolated 27.4 grams which was shown to contain 85 percent 2-chloroethylphosphonic acid. The NMR spectrum was identical with that obtained in Example II.

EXAMPLES IV TO VIII

The reaction of Example II was repeated except that the acyloxy starting materials were those of the following listing:

| Example number | Starting material |
|---|---|
| IV | $ClCH_2CH_2\overset{O}{\underset{\|}{C}}OCH_2CH_2\overset{O}{\underset{\|}{P}}-OCH_2CH_2Cl$<br>$\quad\quad\quad\quad\quad\quad\quad\quad\quad\;\;OCH_2CH_2Cl$ |
| V | $ClCH_2\overset{O}{\underset{\|}{C}}OCH_2CH_2\overset{O}{\underset{\|}{P}}-OCH_2CH_3$<br>$\quad\quad\quad\quad\quad\quad\quad\;\;OCH_2CH_2Cl$ |
| VI | 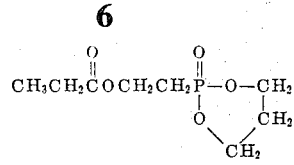 |
| VII | 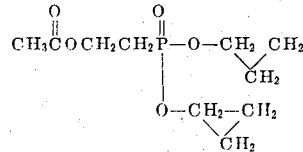 |
| VIII | 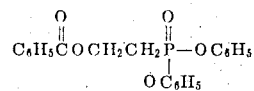 |

Using the same reaction conditions and recovery techniques as in Example II, 2-chloroethylphosphonic acid in good purity was recovered in each of Examples IV to VIII.

The invention has been described herein with reference to certain preferred embodiments but is not to be considered as limited thereto as obvious variations thereon will become apparent to those skilled in the art.

What is claimed is:

1. A process for the preparation of 2-haloethylphosphonic acid which comprises reacting a 2-acyloxyethylphosphonic acid or ester of the formula:

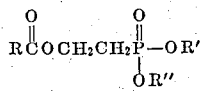

wherein R is alkyl of one to seven carbon atoms, cycloalkyl of three to eight carbon atoms, haloalkyl of one to seven carbon atoms, or aryl of six to 12 carbon atoms, R' is hydrogen, alkyl of one to seven carbon atoms, haloalkyl of two to seven carbon atoms, or cycloalkyl of three to eight carbon atoms, and R'' is the same or different from R', or R' and R'' are joined by two to six methylene groups to form a heterocyclic ring system, with anhydrous hydrogen halide at a temperature ranging from 30°–200°C.

2. A process according to claim 1 wherein the hydrogen halide is hydrogen chloride and the final product is a 2-chloroethylphosphonic acid.

3. A process according to claim 2 wherein the reaction is conducted at atmospheric pressure.

4. A process according to claim 3 wherein an excess of at least 3 moles of the hydrogen chloride is employed in the reaction.

5. A process according to claim 4 wherein the reaction is conducted at a temperature of 100°–160°C.

6. A process according to claim 4 wherein the reaction is conducted at 150°C.

7. A process according to claim 5 wherein R is methyl, and R' and R'' are ethyl.

8. A process according to claim 5 wherein R is methyl and R' and R'' are hydrogen.

9. A process according to claim 5 wherein R is methyl and R' and R'' are 2-chloroethyl.

* * * * *